June 4, 1946.   E. EGER   2,401,627
PUNCTURE SEALING GAS TANK
Filed May 16, 1941   2 Sheets-Sheet 1
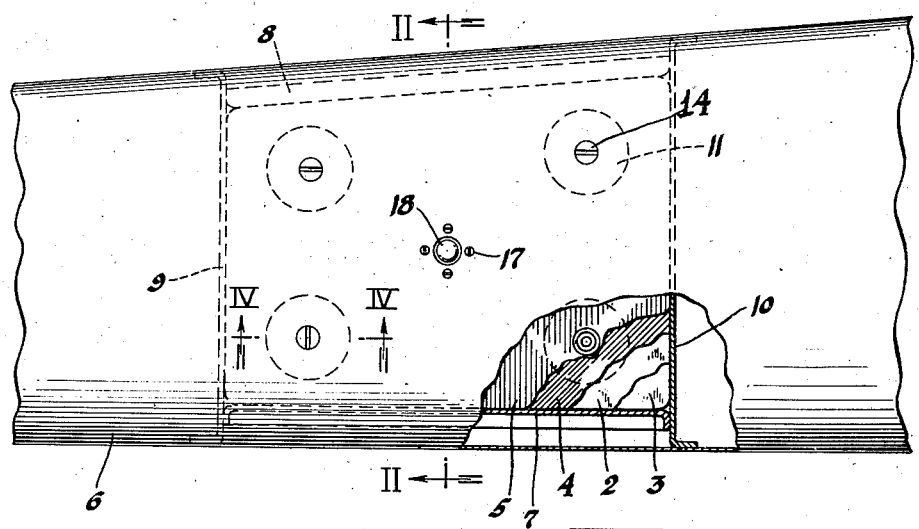
Fig. 1
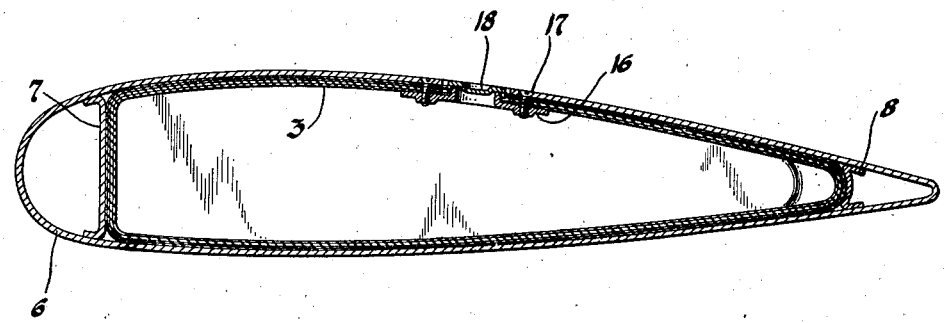
Fig. 2
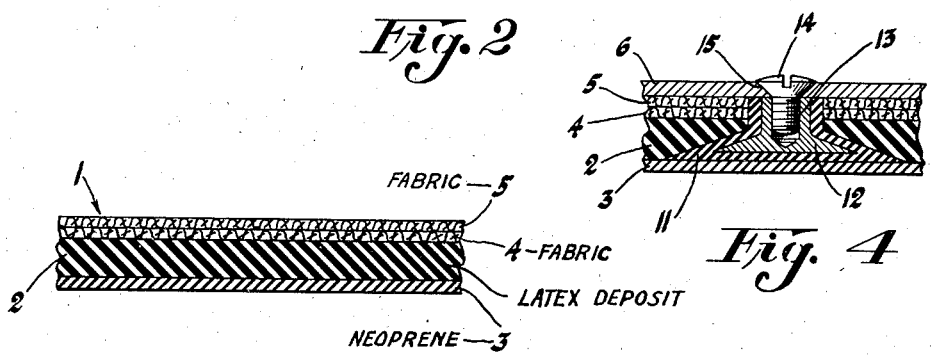
Fig. 3
Fig. 4
INVENTOR
Ernst Eger
BY Lester G. Buslong
ATTORNEY June 4, 1946.　　　　E. EGER　　　　2,401,627
PUNCTURE SEALING GAS TANK
Filed May 16, 1941　　　　2 Sheets-Sheet 2

5 — FABRIC
4
2 — LATEX DEPOSIT
21 — CELLULOSE ACETATE
20 — FABRIC
3 — NEOPRENE

INVENTOR
Ernst Eger
BY Lester G. Busling
ATTORNEY

Patented June 4, 1946

2,401,627

UNITED STATES PATENT OFFICE 2,401,627

PUNCTURE SEALING GAS TANK

Ernst Eger, Grosse Pointe Park, Mich., assignor to United States Rubber Company, New York, N. Y., a corporation of New Jersey Application May 16, 1941, Serial No. 393,795

6 Claims. (Cl. 154—43.5)

This invention relates to puncture sealing fuel tanks and in particular it relates to a flexible puncture sealing lining in combination with means to prevent the lining from sagging or collapsing.

Fuel tanks, such as puncture sealing fuel tanks for airplanes, to be effective require a critical combination of flexible or plastic layers, shock retaining layers and an outer supporting layer. It is recognized that various combinations of materials have been assembled in order to provide a puncture sealing or bullet sealing fuel tank construction. In the practice of my invention I have found a novel association of layers of different materials which function collectively to form a sealing means and to provide a support for the sealing means which functions to limit the rupture in the sealing layer produced by puncturing means.

Briefly my invention comprises a flexible puncture sealing wall forming a tank lining inclosure, the wall of which includes a layer of the direct deposit of solids of rubber latex and a plurality of layers of cord fabric adhered to the outer surface of the latex deposited layer. The cords in the adjacent layers of fabric lie in a direction to form an angle within critical limitations with the result that the amount of tear of the fabric due to puncturing means is limited to a relatively small area. The invention also contemplates means for supporting the lining so that it will conform without sagging to the general outline of a supporting container with which the lining is used.

Among the objects of my invention are to provide in combination a laminated material possessing highly efficient sealing characteristics; to provide a flexible tank which will not sag or collapse; to provide a puncture sealing tank which is light in weight; and to provide a tank lining unit which may be manufactured efficiently and economically. These and other objects and advantages will appear more fully in the following detailed description when considered in connection with the accompanying drawings in which:

Fig. 1 is a plan view, partly broken away, of a portion of an airplane wing enclosing a fuel tank embodying my invention;

Fig. 2 is a transverse view thereof, in section, taken along lines II—II of Fig. 1;

Fig. 3 is an enlarged transverse view, in section, of a portion of a tank wall;

Fig. 4 is a transverse view, in section taken along lines IV—IV of Fig. 1 illustrating means for attaching a tank lining to an airplane wing;

Figure 5:
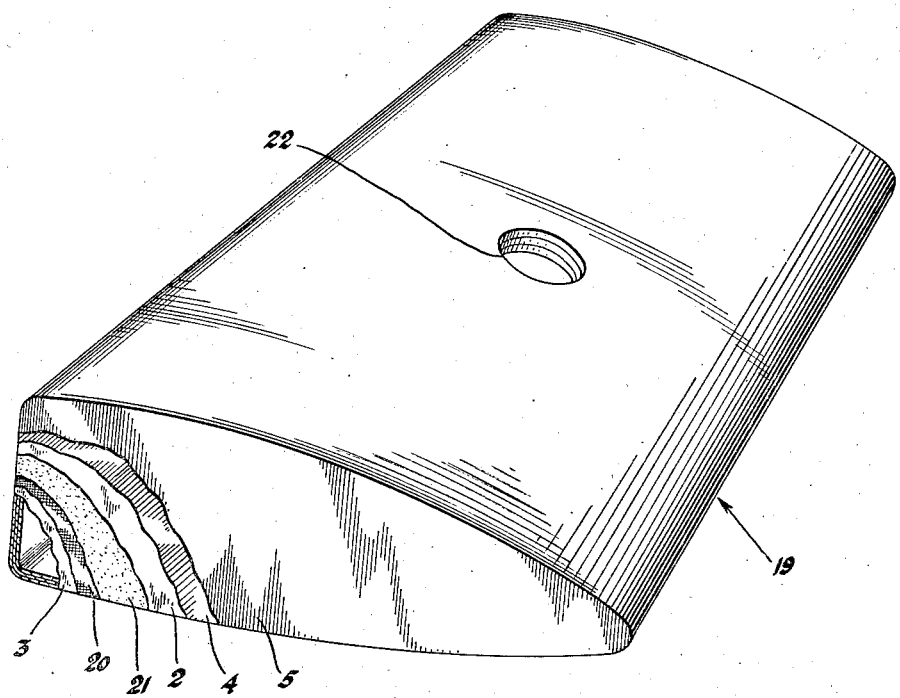
Fig. 5 is a perspective view, partly broken away, of a self-supporting tank lining enclosure representing a modification of my invention.

With reference to the drawings and in particular to Figures 1 and 3, I show an embodiment of my invention in the form of a tank 1, the wall of which is formed of a plurality of laminations of materials possessing different characteristics. The principal sealing material of this wall is a layer 2 of the direct deposit of solids of rubber latex. The latex preferably does not contain any vulcanizing ingredients or fillers. Preferably this layer is formed by spreading liquid latex on a belt or other surface to form a film, drying the film, spreading another film of liquid latex on top of the previously dried film and repeating the operation the necessary number of times to obtain a sheet of the proper thickness for the layer 2. Tests have indicated that the thickness of the layer 2 should be in the order of 0.20 inch. With such repeated spreading and drying operations to build up the latex deposited sheet for the layer 2, somewhat over fifty passes through a spreader and drier are necessary to obtain a thickness of 0.20 inch. If desired, a coagulant may be used on the belt or on any latex deposit or deposits to build up the required thickness in a fewer number of passes, since a heavier latex spread may be applied on top of a coagulant. If desired, a belt may be passed through successive latex and coagulant baths to build up the required thickness of latex deposited sheeting.

A wall of latex deposited rubber is not suitable in itself as a container for fuels such as gasoline, benzol, oil, or the like. To protect the latex deposited layer from the fuel which is placed within the tank, I provide a layer 3 which is adhered to the inner surface of the wall of the latex deposited layer 2. The layer 3 is formed of a material which resists the action of fuels such as gasoline or oil. An example of such a material is the synthetic rubber or rubber-like material sold under the trade name Neoprene, polymerized chloro-2-butadiene 1,3. The Neoprene layer is calendered to a thickness of approximately 0.035 inch and is vulcanized in sheet form. An adhesive such as a self-curing rubber cement is used to attach the Neoprene layer 3 permanently to the layer 2.

To the opposite surface, or the outer surface, of the latex deposited layer 2 is attached in adhered relationship a pair of fabric layers 4 and 5. These layers or plies are formed of cord fabric, as distinguished from woven fabric, that is, the fabric is formed of a plurality of cords assembled in close parallel relationship and maintained in that relationship principally by an encasement of the cords in a rubber composition. The cords of which the fabric are formed is of a material possessing a high tensile strength. An example of such a material is rayon cord of a gauge of 0.022 inch assembled in parallel relationship to form a layer of fabric having approximately 34 cords per inch. The tensile strength of each cord is in the order of 14 lbs. and the stretch of the cord at 10 lbs. load is about 10%. By forming the fabric of such a material it is possible to obtain a relatively lightweight material having a high tensile strength and proper elongation. Occasional pick threads are used to maintain the cords of the fabric in parallel relation. The rayon cord fabric is dipped into a latex composition or other adhesive in order to provide a strong bond between the rayon cords, and a coating of rubber composition is thereafter applied to both surfaces of the rayon fabric. Skim coats of rubber composition are applied to the fabric on both sides in a calendering operation. This practice is much the same as the preparation of rubberized cord fabric for use in the manufacture of tires. The two layers 4 and 5 of rubberized rayon cord fabric are assembled together in laminated relationship and vulcanized, resulting in a combined thickness of approximately .068 inch.

One of the important features in assembling the layers 4 and 5 together is that the cords in the adjacent layers should extend in a direction to form an angle of the order of 45°. This angle may vary somewhat but should lie between 30° and 60° relative to each other. This different directional position of the cords in adjacent plies, is important in order to prevent excessive tearing of the fabric when it is pierced by an object such as a projectile. When the cords in adjacent plies are positioned at an angle of 90°, tests have indicated that excessive tearing results. This condition is substantially minimized when the cords in one of the layers are positioned diagonally relative to the cords in the other layer. After the two layers of fabric 4 and 5 are vulcanized together they form in effect a single layer which in turn is cemented to the outer surface of the layer 2 of the direct deposit of solids of rubber latex. In assembling the fabric layers 4 and 5 with the layer 2, it is preferable to position the fabric so that the cords in one of the layers will extend in a vertical position on all vertical or nearly vertical surfaces of the tank. By following this procedure greater rigidity is obtained in the vertical walls of the tank.

These various layers may be assembled together to form a unit wall and the unit wall may thereafter be shaped and spliced to form the fuel tank inclosure. This is the preferred practice. However, if desirable the layers may be assembled individually one upon another, each individual layer conforming with the outline of the tank.

When the various layers are assembled to form the lining inclosure 1, the unit is placed within an outer casing such as an airplane wing 6. This wing includes end supports 7 and 8 and side supports 9 and 10, thus providing a complete support for retaining the tank unit 1.

As the wall of the tank unit is flexible, it is necessary to provide means to prevent at least the upper wall of the tank from sagging or collapsing. Fig. 4 illustrates one method of preventing the top wall of the tank from collapsing. This consists of a base or pad member 11 of vulcanized rubber composition having imbedded therein a flanged metallic insert 12. The pad 11 lies within the layer 2 and is cemented thereto. A portion of this pad extends through the fabric layers 4 and 5 and is flush with the outer surface of the fabric layer 5. The base surface of the pad 11 is flush with the inner surface of the latex deposited layer 2. This permits the Neoprene protecting layer 3 to form a covering for the base 11 as well as a covering for the layer 2. The pad 11 is adhered with a self-curing cement to all of the layers of the wall with which it contacts. The insert 12 is provided with a threaded aperture 13 for cooperative engagement with a machine screw 14. When the tank lining unit is assembled within the wing wall 6, the inserts 12 are aligned with an aperture 15 extending through the wall of the wing 6. The machine screw 14 extends through the aperture 15 of the wing wall, and the upper portion of the lining wall is secured thereto. A plurality of such units are located at the top wall of the lining unit 1 thus maintaining this portion of wall in close association with the upper wall of the wing 6.

Also assisting in maintaining the upper wall of the tank lining in proper relationship with the wing 6 is a tank inlet fitting comprising essentially a flange 16 which secures the wall of the lining material in clamping relationship with the wall of the wing 6 by means of machine screws 17. A removable cap 18 associated with the flange 16 provides entrance means to the interior of the tank.

Figure 6:
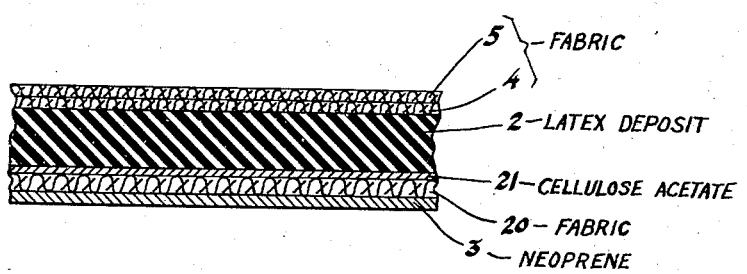
Fig. 6 is an enlarged view, in section, of a portion of the wall forming the tank as shown in Fig. 5.

Referring to Figures 5 and 6, I show a modification of the invention in the form of a tank 19 having unit means for preventing the puncture sealing lining material forming the tank wall from collapsing or sagging. As in the first modification, the puncture sealing wall of the tank 19 includes the layer 2 of the direct deposit of solids of rubber latex in combination with a pair of rayon cord fabric layers 4 and 5. As previously described the layers 4 and 5 are rubberized, vulcanized together and cemented to the latex deposited layer 2. The inner wall of the tank is provided with means for stiffening the tank assembly so as to prevent the walls from sagging or collapsing. This means comprises a heavy square woven fabric 20 such as a 21 oz. duck. The surface of the fabric 20 facing the inside of the tank is formed of a layer of material such as the layer 3 which is resistant to the action of liquids placed within the tank, Neoprene being heretofore mentioned for this purpose. As in the previous illustration, a self-curing cement is used to adhere the layer 3 to its adjacent layer which in this case is the duck fabric 20.

Another method of obtaining adhesion between the fabric 20 and the Neoprene layer 3 is to apply the Neoprene in a frictioning operation so as to form a thin coat on the fabric. Thereafter a calendered layer of Neoprene is applied to the fabric leaving a coat, the total thickness of which is approximately .015 inch to .045 inch. After the Neoprene is applied to the fabric, it is vculcanized while the materials are in sheet form.

In order to increase the rigidity of the fabric 20, the surface opposite the Neoprene coated surface is provided with a film 21 of cellulose acetate. This film is applied to the fabric in several coats, the first coat preferably being relatively thin, that is, it is diluted with a solvent such as ethyl acetate in order that it may penetrate the interstices of the fabric. It has been found that a total of 5 coats of cellulose acetate will function as a desirable stiffening medium, the total thickness of the deposit being approximately .005 inch. Besides functioning as a stiffening agent, the cellulose acetate inhibits the diffusion of materials such as gasoline and benzol through the tank lining. Also the drying of the cellulose acetate causes the fabric to shrink, thereby removing any bagginess from the tank and, at the same time, increasing the tear resistance of the fabric. The combination layer of Neoprene, fabric and cellulose acetate is cemented as a unit layer to the latex deposited layer 2. The cement is applied to the surface of the cellulose acetate film 21 and/or to the surface of the layer 2. The layers are then brought together in adhered relationship so as to form in effect a unit wall comprised of associated layers of Neoprene, duck, cellulose acetate, dried latex, and a pair of rubberized sheets of rayon cord fabric. A self-curing rubber cement is preferred as an adhesive material for application between the cellulose acetate and the dried latex layers.

Sheets of this composite material may be formed to provide the walls of various shaped tanks and, as shown in Fig. 5, various openings such as an opening 22 may be cut through the wall of the tank to provide conventional fittings usually associated with fuel tanks.

In forming a tank from the composite wall, the various joints or splices may be effected in any conventional manner such as joining the materials together in butted, skived or overlapped relationship and uniting the materials with a self-curing cement. Splices or joints formed from the Neoprene layer 3 are united by a cement material having the same oil resisting characteristics as the layer 3.

Demonstrations have shown that the tank of my invention is capable of withstanding numerous punctures by .30 and .50 caliber projectiles without any substantial loss of the contents of the tank. The two plies 4 and 5 of rayon cord fabric support the wall with the proper degree of resiliency yet provide a firm support for the latex deposited layer 2. Also the critical angle of positioning of the cords in the adjacent layers 4 and 5 functions to divert the tearing path of the fabric resulting from the force of the projectile. By this construction the length of tear in the fabric layers 4 and 5, is limited to relatively small apertures, thereby permitting the fabric to retain an adequate support for the layer 2 of the direct deposit of solids of rubber latex. The layer 2 forms the principal sealing medium and, as a projectile moves therethrough, a very small hole is formed in the layer due to its inherent plastic flow nature. When such a hole is made in the layer 2, the fuel in the tank comes in contact with the rubber, swelling it and quickly sealing the opening, and thus preventing loss of the contents of the tank. Since unvulcanized rubber swells in solvents faster than vulcanized rubber, the layer 2 is preferably unvulcanized to give the maximum swelling rate of the rubber when contacted with fuel in the tank, but, if desired, the layer 2 may be slightly vulcanized without unduly retarding the swelling effect of such fuel. The swelling of rubber by rubber solvents is followed, however, by dissolution or dispersion of the rubber in the solvent, and where a projectile pierces a fuel tank as in the present case, such dissolution of the rubber in the solvent which follows the swelling will tend to produce a permanent hole in the layer 2. The dissolution rate of the direct deposit of solids of rubber latex, as in the sealing layer 2 in the present invention, however, is almost nil compared to the relatively high dissolution rate of rubber that has been broken down as by milling and sheeting. Therefore, the effectiveness of the present layer 2 is much greater than of the prior art sealing walls of conventional calendered rubber. Even the small amount of breakdown necessary to form uncompounded crude rubber into sheets, gives an exceedingly high rate of dissolution of the rubber in organic rubber solvents compared with a latex deposited layer as in the present case. The manufacture of the sealing layer 2 by directly depositing solids from latex thus vastly improves the sealing function of the layer over similar sealing means made according to conventional rubber practice.

As thus shown and described, it is believed apparent that I have provided a novel tank lining structure having a high resistance against leakage produced by punctures, in combination with non-collapsible features, and while I have shown a preferred embodiment of my invention, it is to be understood that it is susceptible of those modifications which appear within the spirit of the invention and the scope of the appended claims.

Having thus described my invention what I claim and desire to protect by Letters Patent is:

1. A container for hydrocarbon fuels including a wall comprising the combination of a puncture-sealing layer of unmilled deposited rubber latex of a thickness in the order of 0.20 inch, a coating which is inert and impervious to hydrocarbon fuels adhered to the inner surface of the latex, at least two layers of cord fabric adhered to the outer surface of the rubber layer, the cords in adjacent layers being disposed at an angle between 30° and 60°, and a layer of vulcanized rubber composition encasing each layer of cord fabric and joining the fabric layers together in bonded relationship.

2. A self-supporting puncture sealing container comprising a woven fabric wall, a film of cellulose acetate adhered to one side of the fabric wall and a lining adhered to the opposite side of the wall, said lining being impervious and inert to hydrocarbon fuels, a layer of latex deposited rubber adhered to the film of cellulose acetate, and a plurality of layers of cord fabric adhered to the outer surface of the rubber layer.

3. A self-supporting puncture sealing container comprising a woven fabric wall, a film of cellulose acetate adhered to one side of the fabric wall and a lining adhered to the opposite side of the wall, said lining being impervious and inert to hydrocarbon fuels, a layer of latex deposited rubber adhered to the film of cellulose acetate and at least two layers of cord fabric adhered to the outer surface of the rubber layer, the cords in adjacent layers being disposed at an angle between 30° and 60°.

4. A self-supporting puncture sealing container comprising a woven fabric wall, a film of cellulose acetate adhered to one side of the fabric wall and a lining adhered to the opposite side of the wall, said lining being inert and impervious to hydrocarbon fuels, a layer of latex deposited rubber of a thickness in the order of 0.20 inch, at least two layers of cord fabric adhered to the outer surface of the rubber layer, the cords in adjacent layers being disposed at an angle between 30° and 60° and a layer of vulcanized rubber composition encasing each layer of cord fabric and joining the fabric layers together in bonded relationship.

5. A flexible, puncture sealing wall forming a tank lining inclosure comprising a layer of latex deposited rubber, a plurality of layers of cord fabric adhered to the outer surface of the rubber layer, an outer casing forming a rigid inclosure for the flexible lining, a flexible pad formed of vulcanized rubber composition adhered to and disposed within the latex layer, a metal insert embedded in the vulcanized rubber, and means for joining the insert with the outer casing.

6. A flexible, puncture sealing wall forming a tank lining inclosure comprising a layer of unmilled and unvulcanized rubber of a thickness in the order of 0.20 inch, at least two layers of cord fabric adhered to the outer surface of the rubber, the cords in adjacent layers disposed at an angle between 30° and 60°, an outer casing forming a rigid inclosure for the flexible lining, a plurality of flexible pads formed of vulcanized rubber composition adhered to the upper wall of the lining, metal inserts imbedded in the vulcanized rubber of each flexible pad and means for joining the inserts with the outer casing.

ERNST EGER.